US012603074B2

(12) United States Patent
Su et al.

(10) Patent No.: US 12,603,074 B2
(45) Date of Patent: Apr. 14, 2026

(54) PLAYBACK DEVICE, CONTROL METHOD AND CONTROL APPARATUS THEREFOR, AND COMPUTER-READABLE STORAGE MEDIUM

(71) Applicant: VIVO MOBILE COMMUNICATION CO., LTD., Guangdong (CN)

(72) Inventors: Qian Su, Guangdong (CN); Huiping Chen, Guangdong (CN); Ruoyu Chen, Guangdong (CN); Qing Ye, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 181 days.

(21) Appl. No.: 18/431,593

(22) Filed: Feb. 2, 2024

(65) Prior Publication Data

US 2024/0177701 A1 May 30, 2024

Related U.S. Application Data

(63) Continuation of application No. PCT/CN2022/109134, filed on Jul. 29, 2022.

(30) Foreign Application Priority Data

Aug. 2, 2021 (CN) ......................... 202110883044.3

(51) Int. Cl.
*G10K 11/162* (2006.01)
*H04R 1/02* (2006.01)

(52) U.S. Cl.
CPC ............. *G10K 11/162* (2013.01); *H04R 1/02* (2013.01); *H04R 2201/02* (2013.01)

(58) Field of Classification Search
CPC ..... H04R 1/02; H04R 2201/02; G10K 11/162
See application file for complete search history.

(56) References Cited

U.S. PATENT DOCUMENTS 7,080,816 B1 * 7/2006 Vaccaro ................. F16M 11/18 248/530
8,189,849 B2 * 5/2012 Waddell ................... H04R 1/02 381/387

(Continued)

FOREIGN PATENT DOCUMENTS

CN 103002376 A 3/2013
CN 206658288 U 11/2017

(Continued)

OTHER PUBLICATIONS

Extended European Search Report for Application No. 22852077.1, dated Nov. 6, 2024.

(Continued)

*Primary Examiner* — Forrest M Phillips
(74) *Attorney, Agent, or Firm* — BROOKS KUSHMAN P.C.

(57) ABSTRACT

A playback device including a housing, an audio player, a sound insulation cover, a target detection apparatus, and a driving mechanism. A sound hole is disposed on the housing, the sound insulation cover is disposed in the housing, the audio player is disposed in the sound insulation cover, a sound outlet is disposed on the sound insulation cover, the target detection apparatus is configured to detect a target direction, the driving mechanism is connected to the sound insulation cover, and in a case that the sound outlet does not face the target direction, the driving mechanism is controlled to start, and the driving mechanism drives the sound insulation cover to rotate, so that the sound outlet faces the target direction. This application discloses a control method for a playback device, a control apparatus for a playback device, and a computer-readable storage medium.

17 Claims, 6 Drawing Sheets

(56) References Cited

U.S. PATENT DOCUMENTS

| | | | | |
|---|---|---|---|---|
| 9,510,097 | B1 * | 11/2016 | Tsai | H04R 1/086 |
| 10,468,007 | B1 * | 11/2019 | Cunningham | G10K 11/162 |
| 11,276,383 | B2 * | 3/2022 | Barski | G10K 11/20 |
| 11,640,276 | B2 * | 5/2023 | Chilakamarthy Venkata | G06F 3/167 704/275 |
| 2017/0157573 | A1 * | 6/2017 | Mori | G06F 1/1656 |
| 2018/0315409 | A1 * | 11/2018 | Matsuo | G10K 11/002 |
| 2019/0069078 | A1 * | 2/2019 | Johnson | H04R 1/025 |
| 2019/0394563 | A1 | 12/2019 | Kim | |
| 2022/0014845 | A1 | 1/2022 | Zhang et al. | |
| 2024/0205577 | A1 * | 6/2024 | Cai | H04R 1/028 |

FOREIGN PATENT DOCUMENTS

| | | | |
|---|---|---|---|
| CN | 109284081 | A | 1/2019 |
| CN | 210781300 | U | 6/2020 |
| CN | 111638779 | A | 9/2020 |
| CN | 113676818 | A | 11/2021 |
| WO | 2020087745 | A1 | 5/2020 |

OTHER PUBLICATIONS

International Search Report and Written Opinion for Application No. PCT /CN2022/109134, dated Oct. 31, 2022, 8 Pages.

* cited by examiner

PLAYBACK DEVICE, CONTROL METHOD AND CONTROL APPARATUS THEREFOR, AND COMPUTER-READABLE STORAGE MEDIUM

CROSS-REFERENCE TO RELATED APPLICATIONS

This application is a continuation of Application No. PCT/CN2022/109134 filed on Jul. 29, 2022, which claims priority to Chinese Patent Application No. 202110883044.3 filed on Aug. 2, 2021, which are incorporated herein by reference in their entireties.

TECHNICAL FIELD

This application relates to the technical field of playback devices, and in particular, to a playback device, a control method and a control apparatus therefor, and a computer-readable storage medium.

BACKGROUND

With the rapid development of the playback device industry, users have increasingly high application requirements for a playback device. For an audio playback device, requirements of the user for the playback device are not only improvement of sound quality, but also require that the playback device is increasingly intelligent and humanized. Currently, a playback device in the market cannot implement directional playback according to a location of the user.

SUMMARY

According to a first aspect, an embodiment of this application provides a playback device, including:

- a housing, where a sound hole is disposed on the housing;
- an audio player;
- a sound insulation cover, where the sound insulation cover is disposed in the housing, the audio player is disposed in the sound insulation cover, and a sound outlet is disposed on the sound insulation cover;
- a target detection apparatus, where the target detection apparatus is configured to detect a target direction; and
- a driving mechanism, where the driving mechanism is disposed in the housing, the driving mechanism is connected to the sound insulation cover, and the driving mechanism is configured to drive the sound insulation cover to rotate, so that the sound outlet faces the target direction.

According to a second aspect, an embodiment of this application discloses a control method for a playback device, where the control method includes:

- enabling a directional playback mode;
- detecting a target direction; and
- in a case that the sound outlet does not face the target direction, controlling the driving mechanism to start, so that the sound outlet faces the target direction.

According to a third aspect, an embodiment of this application discloses a control apparatus for a playback device, where the playback device is the foregoing playback device, and the control apparatus includes:

- a detection module, configured to detect a target direction; and
- a control module, configured to: in a case that the sound outlet does not face the target direction, control the driving mechanism to start, so that the sound outlet faces the target direction.

According to a fourth aspect, an embodiment of this application discloses a playback device, including a processor, a memory, and a computer program that is stored in the memory and that can be run on the processor, and when the computer program is executed by the processor, steps of the foregoing control method are implemented.

According to a fifth aspect, an embodiment of this application discloses a computer-readable storage medium. The computer-readable storage medium stores a computer program, and when the computer program is executed by a processor, steps of the foregoing control method are implemented.

According to a sixth aspect, a chip is provided, including a processor and a communications interface. The communications interface is coupled to the processor, and the processor is configured to run a program or an instruction to implement steps of the foregoing control method.

According to a seventh aspect, a computer program/program product is provided, and the computer program product/program product is stored in a non-transitory storage medium, and the program/program product is executed by at least one processor to implement steps of the foregoing control method.

According to an eighth aspect, an electronic device is provided, and the electronic device is configured to perform steps of the foregoing control method.

BRIEF DESCRIPTION OF DRAWINGS

To describe the solutions in the embodiments of this application more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

In the drawings.

Figure 1:
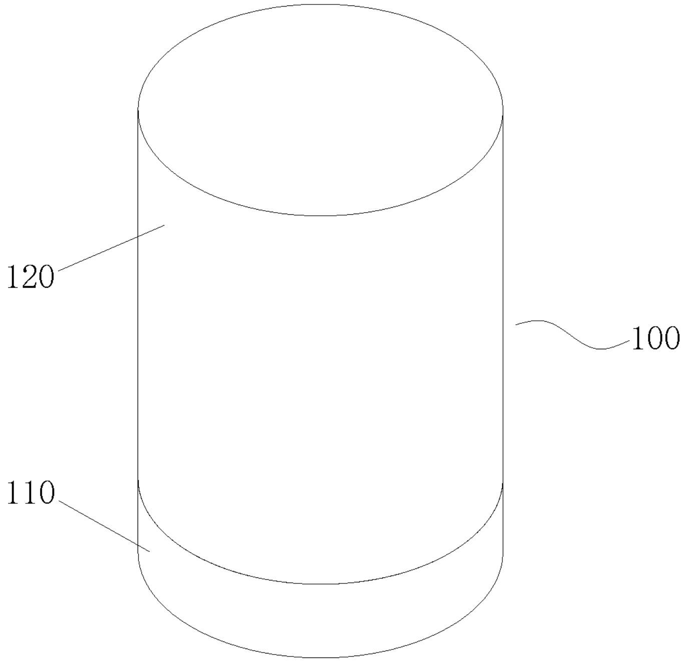
FIG. 1 is a schematic diagram of an outer side of a playback device according to an embodiment of this application.

100—Housing, 110—Base, 111—Column shaft, 120—Sleeve, 121—Mounting slot; 200—Audio player;

300—Sound insulation cover, 310—Outer housing, 311—First through-hole, 312—Flanging, 320—Inner housing, 321—Second through-hole, 330—Elastic film, 331—First end, 332—Second end; 400—Target detection apparatus;

510—First magnetic member, 520—Second magnetic member, 530—Coil, 540—First elastic member, 550—Second elastic member; 600—Power source;

700—Rotation bracket, 710—Rotating part, 720—Bearing part, 730—Shaft hole; 1200—Playback device, 1201—Radio frequency unit, 1202—Network module, 1203—Audio output unit, 1204—Input unit, 12041—Graphics processing unit, 12042—Microphone, 1205—Sensor, 1206—Display unit, 12061—Display panel, 1207—User input unit, 12071—Touch panel, 12072—Another input device, 1208—Interface unit, 1209—Memory, 1210—Processor, 1211—Power supply.

DETAILED DESCRIPTION

To make the objectives, technical solutions, and advantages of this application clearer, the technical solutions of this application are described in detail below. Apparently, the described embodiments are merely some rather than all of embodiments of this application. All other embodiments obtained by a person of ordinary skill in the art based on embodiments of this application without creative efforts shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and a quantity of objects is not limited. For example, there may be one or more first objects. In addition, in this specification and the claims, "and/or" represents at least one of connected objects, and a character "/" generally represents an "or" relationship between associated objects.

A playback device provided in the embodiments of this application is described in detail below with reference to FIG. 1 to FIG. 10 by using specific examples and application scenarios thereof.

An embodiment of this application discloses a playback device, and the disclosed playback device includes a housing 100, an audio player 200, a sound insulation cover 300, a target detection apparatus 400, and a driving mechanism.

The housing 100 is a basic component of the playback device, and provides a protection and mounting basis for other functional components of the playback device. In this embodiment of this application, the housing 100 has accommodating space, and the audio player 200, the sound insulation cover 300, and the driving mechanism are disposed in the accommodating space. A sound hole (not shown in the figure) is disposed on the housing 100, and an audio signal played by the audio player 200 may be propagated outside the housing 100 through the sound hole.

Optionally, the audio player 200 may be disposed in the housing 100 in a fixed manner. Further, the audio player 200 is disposed in the sound insulation cover 300. The sound insulation cover 300 is provided with a sound outlet, an audio signal that is played by the audio player 200 and that is corresponding to the sound outlet may be propagated outside the housing 100 through the sound outlet and the sound hole, and audio signals in another direction that are played by the audio player 200 are blocked by the sound insulation cover 300, so that directional playback of the playback device is implemented.

The target detection apparatus 400 may detect a target direction, and the driving mechanism is connected to the sound insulation cover 300. The driving mechanism is configured to drive the sound insulation cover 300 to rotate, so that the sound outlet faces the target direction, and the playback device directionally plays the audio signal in the target direction.

According to the playback device disclosed in this embodiment of this application, the target detection apparatus 400 may detect the target direction, and in a case that the sound outlet does not face the target direction, the target detection apparatus 400 controls the driving mechanism to start, and the driving mechanism drives the sound insulation cover 300 to rotate, so that the sound outlet faces the target direction. An audio signal that is played by the audio player 200 and that is corresponding to the sound outlet may be propagated outside the housing 100 through the sound outlet and the sound hole to be received by a user, and audio signals in another direction that are played by the audio player 200 are blocked by the sound insulation cover 300, so that the playback device performs directional playback in the target direction.

As shown in FIG. 3 to FIG. 6, the sound insulation cover 300 includes an outer housing 310, an inner housing 320, and an elastic film 330. A first through-hole array is disposed on the outer housing 310, a second through-hole array is disposed on the inner housing 320, there is a gap between the outer housing 310 and the inner housing 320, the elastic film 330 is disposed between the outer housing 310 and the inner housing 320, and the first through-hole array corresponds to the second through-hole array. In such setting, the sound insulation cover 300 may form an acoustic super-material structure, so that a sound insulation effect of the sound insulation cover 300 can be significantly improved, and in particular, blocking of low-frequency noise is more obvious, thereby ensuring sound quality of directional playback of the playback device.

The first through-hole array includes multiple first through-holes 311, and the second through-hole array includes multiple second through-holes 321. In an optional embodiment, the first through holes 311 and the second through holes 321 may be honeycomb holes, and the first through holes 311 are in a one-to-one correspondence with the second through holes 321.

Certainly, the first through-hole array and the second through-hole array may alternatively be square hole arrays or circular hole arrays. Specific shapes of the first through-hole 311 and the second through-hole 321 are not limited in this embodiment.

In this embodiment of this application, the sound insulation cover 300 may be a cylindrical structural member formed by connecting the outer housing 310, the inner housing 320, and the elastic film 330. The sound outlet is disposed on a ring wall of the sound insulation cover 300, and the playback device makes sound outward from a ring side of the cylindrical structural member.

In an optional embodiment, the elastic film 330 is movably disposed between the outer housing 310 and the inner housing 320. In such setting, surface tension of the elastic film 330 may be adjusted by pulling the elastic film 330. When the surface tension of the elastic film 330 reaches a preset value, a sound insulation effect of the elastic film 330 can be significantly improved.

Specifically, the sound insulation cover 300 further includes a tensioning mechanism. The tensioning mechanism is disposed in the housing 100, the tensioning mechanism is connected to the elastic film 330, and surface tension of the elastic film 330 is adjusted by pulling the elastic film 330, so that the surface tension of the elastic film 330 reaches a preset value, thereby improving a sound insulation effect of the audio player 200 during directional playback.

In this embodiment of this application, there may be multiple types of tensioning mechanisms. For example, the tensioning mechanism may be a telescopic mechanism, the telescopic mechanism is connected to the elastic film 330, and the telescopic mechanism extends by using a telescopic traction elastic film 330, to adjust the surface tension of the elastic film 330.

In an optional solution, the tensioning mechanism may be an electromagnetic driving mechanism. Specifically, the tensioning mechanism may include a first magnetic member 510 and a coil 530. The elastic film 330 has a first end 331 and a second end 332 that are away from each other. The first end 331 of the elastic film 330 is connected to the first magnetic member 510. In a case that the coil 530 is charged with electricity, the coil 530 can be magnetically attracted to the first magnetic member 510 to pull the elastic film 330, so that surface tension of the elastic film 330 reaches a preset value, and a sound insulation effect of the sound insulation cover 300 is improved.

Certainly, the tensioning mechanism may include a second magnetic member 520 and a coil 530. The second end 332 of the elastic film 330 is connected to the second magnetic member 520. In a case that the coil 530 is charged with electricity, the coil 530 can be magnetically attracted to the second magnetic member 520 to pull the elastic film 330, so that surface tension of the elastic film 330 reaches a preset value, and a sound insulation effect of the sound insulation cover 300 is improved.

In addition, the tensioning mechanism may also be connected to both the first end 331 and the second end 332 of the elastic film 330, and the tensioning mechanism simultaneously pulls both the first end 331 and the second end 332 of the elastic film 330 to adjust the surface tension of the elastic film 330.

Figure 2:
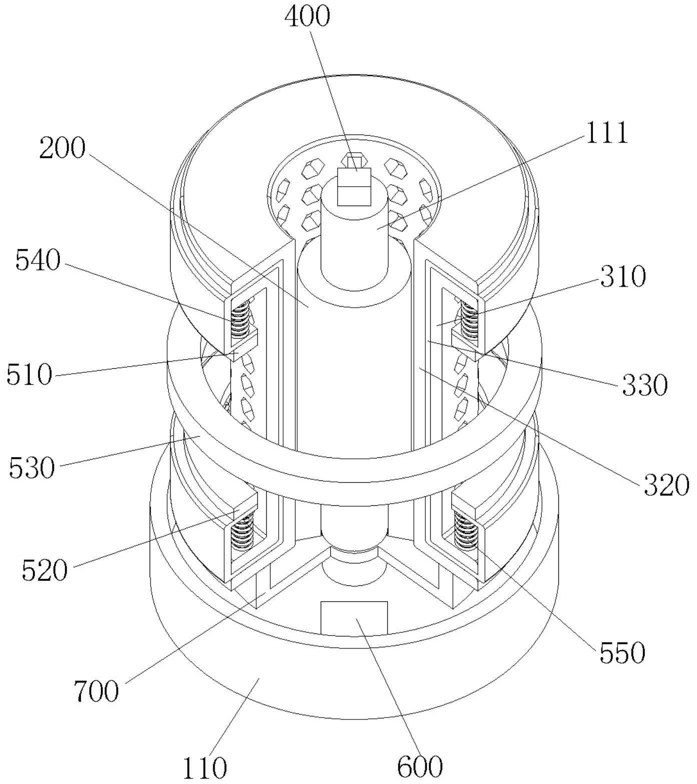
FIG. 2 is a schematic diagram of an inner side of a playback device according to an embodiment of this application.

As shown in FIG. 2, to simplify a structure of the tensioning mechanism and improve compactness of the playback device, the tensioning mechanism includes a first magnetic member 510, a second magnetic member 520, and a coil 530. A first end 331 of the elastic film 330 is connected to the first magnetic member 510, a second end 332 of the elastic film 330 is connected to the second magnetic member 520, the coil 530 is disposed between the first magnetic member 510 and the second magnetic member 520, and in a case that the coil 530 is charged with electricity, the coil 530 is separately magnetically attracted to the first magnetic member 510 and the second magnetic member 520, to simultaneously pull the first end 331 and the second end 332 of the elastic film 330, so that surface tension of the elastic film 330 reaches a preset value.

The first magnetic member 510 and the second magnetic member 520 are structural members made of a magnetic conductive material, and are preferably permanent magnets. The first magnetic member 510 may be bonded and fastened to the first end 331 in an adhesive manner, and the second magnetic member 520 may be bonded and fastened to the second end 332 in an adhesive manner.

Figure 7:
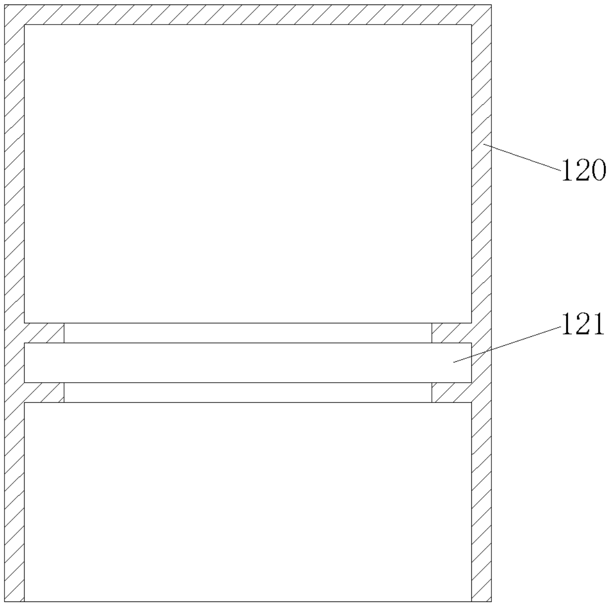
FIG. 7 is a schematic diagram of a structure of a sleeve.

As shown in FIG. 7, a mounting slot 121 is disposed in the housing 100, the coil 530 may be disposed in the mounting slot 121, and the mounting slot 121 fastens the coil 530.

In the foregoing solution, when the playback device is in use, the coil 530 is charged with electricity, so that both the first magnetic member 510 and the second magnetic member 520 can cooperate with the coil 530 to generate action force that can pull the elastic film 330 to expand, and control magnitude of a charged current of the coil 530 to control magnitude of magnetic attraction, so that the surface tension of the elastic film 330 reaches the preset value. In a case that the surface tension is the preset value, the sound insulation cover 300 has an excellent sound insulation effect.

It should be noted that the preset value may be 0.5 MPa, 1 MPa, or 2 MPa, and the preset value of the surface tension of the elastic film 330 may be determined according to an experiment. A specific value of the preset value is not limited in this embodiment of this application. Similarly, a distance between the first magnetic member 510 and the second magnetic member 520 when the surface tension of the elastic film 330 is the preset value may be determined according to an experiment, and magnitude of a charged current of the coil 530 in this case may be recorded.

Further, the tensioning mechanism may further include a first elastic member 540 and/or a second elastic member 550. The first elastic member 540 is disposed between the first magnetic member 510 and the outer housing 310 or the inner housing 320, and an extension-contraction direction of the first elastic member 540 is consistent with a movement direction of the first magnetic member 510. The second elastic member 550 is disposed between the second magnetic member 520 and the outer housing 310 or the inner housing 320, and an extension-contraction direction of the second elastic member 550 is consistent with a movement direction of the second magnetic member 520.

Figure 3:
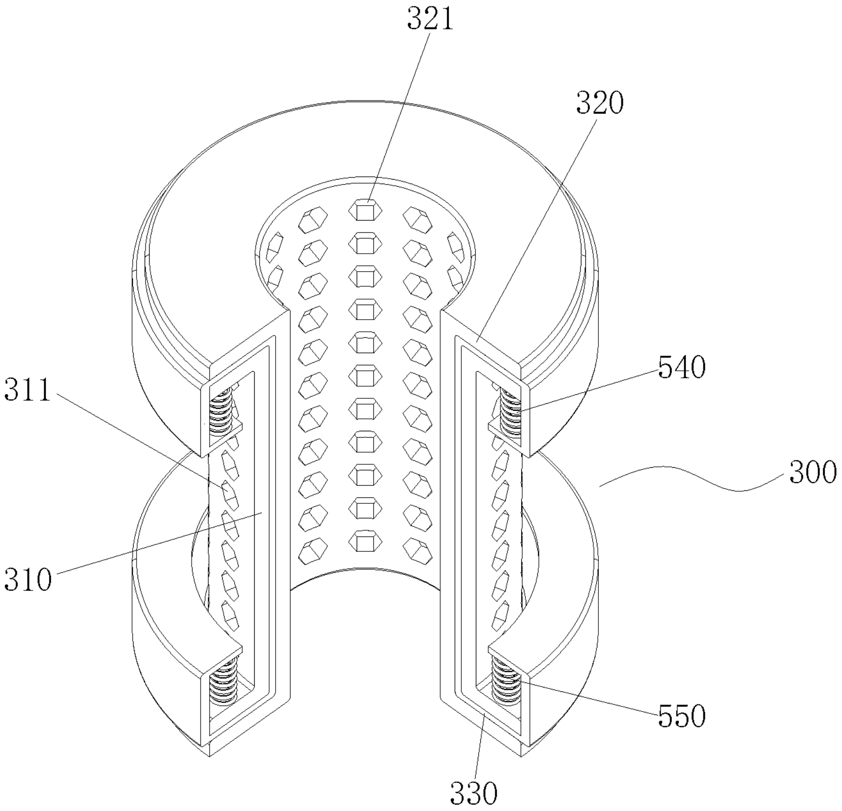
FIG. 3 is a schematic diagram of a structure of a sound insulation cover.
Figure 4:
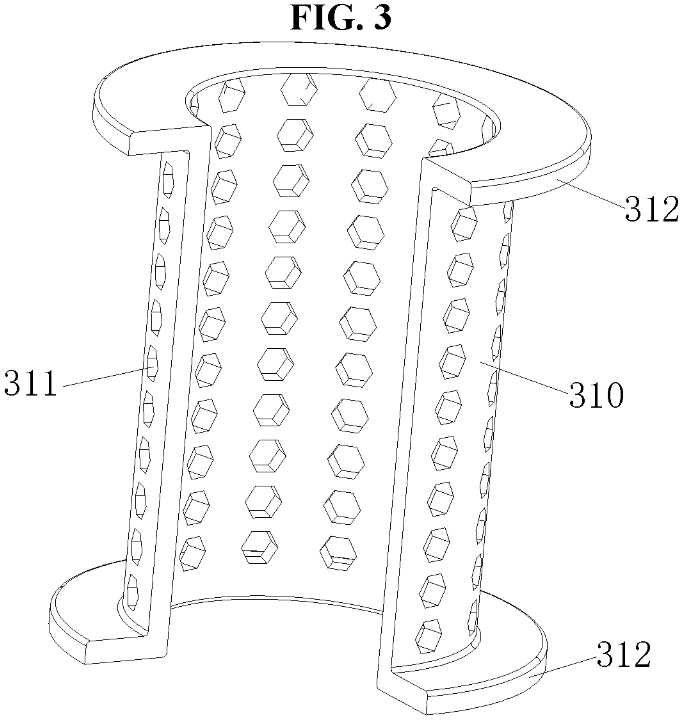
FIG. 4 is a schematic diagram of a structure of an outer housing.
Figure 5:
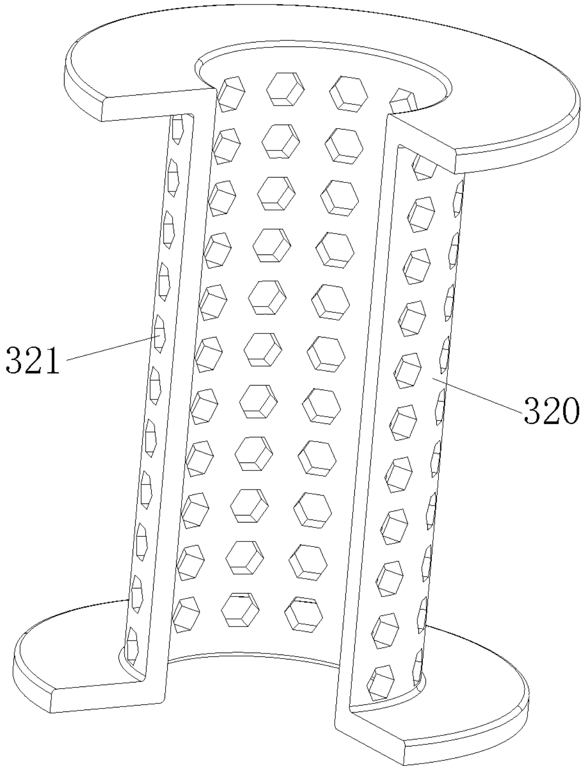
FIG. 5 is a schematic diagram of a structure of an inner housing.
Figure 6:
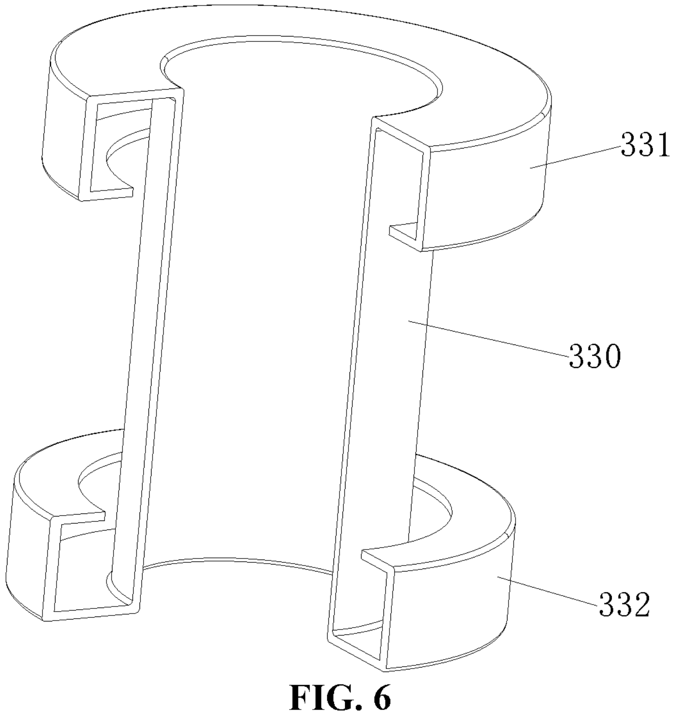
FIG. 6 is a schematic diagram of a structure of an elastic film.

In an optional implementation solution, as shown in FIG. 2 to FIG. 4, the first elastic member 540 is disposed between the first magnetic member 510 and the outer housing 310, the second elastic member 550 is disposed between the second magnetic member 520 and the outer housing 310, there is an outwardly folded flanging 312 on two ends of the outer housing 310, the flanging 312 provides a mounting base for the first elastic member 540 and the second elastic member 550, and the first elastic member 540 and the second elastic member 550 may be disposed on the flanging 312 of the outer housing 310.

In this embodiment of this application, both the first elastic member 540 and the second elastic member 550 may be springs, there are multiple first elastic members 540, all the first elastic members 540 are distributed in a circumferential direction of the sound insulation cover 300, there are multiple second elastic members 550, and all the second elastic members 550 are distributed in the circumferential direction of the sound insulation cover 300. In such setting, in a case that the coil 530 is charged with electricity, the first elastic member 540 and the second elastic member 550 can ensure that the first end 331 and the second end 332 of the elastic film 330 bear force evenly, so that the elastic film 330 is prevented from being damaged due to uneven force-bearing on a part of the elastic film 330 in a pulling process.

In a case that the coil 530 is charged with electricity, magnetic attraction force generated by the first magnetic member 510 and the coil 530 overcomes elastic force of the first elastic member 540, magnetic attraction force generated by the second magnetic member 520 and the coil 530 overcomes elastic force of the second elastic member 550, and the first end 331 and the second end 332 of the elastic film 330 move in opposite directions toward the coil 530, to pull the two ends of the elastic film 330 to expand outward. In a case that the coil 530 is powered off, the first elastic member 540 and the second elastic member 550 are reset, and the first elastic member 540 and the second elastic member 550 may support and shape the first end 331 and the second end 332 of the elastic film 330.

The first magnetic member 510 and the second magnetic member 520 cause controllable deformation of the elastic film 330, so that the first end 331 and the second end 332 move in a direction controllable manner, to avoid irreversible deformation of the elastic film 330, and increase a service life of the elastic film 330.

Certainly, the elastic film 330 may be further fastened between the outer housing 310 and the inner housing 320. In an optional embodiment, the first end 331 and the second end 332 of the elastic film 330 may be fastened between the outer housing 310 and the inner housing 320. In such setting, the surface tension of the elastic film 330 cannot be adjusted, and the elastic film 330 needs to be pulled in advance in a production process, so that the surface tension of the elastic film 330 reaches the preset value.

The outer housing 310 and the inner housing 320 may be structural members made of an ABS plastic material, and the elastic film 330 may be a structural member made of a rubber material. Specific materials of the outer housing 310, the inner housing 320, and the elastic film 330 are not limited in this embodiment.

The housing 100 may include a base 110 and a sleeve 120. The sleeve 120 is connected to the base 110, and accommodation space is defined between the base 110 and the sleeve 120. A sound hole is disposed on the sleeve 120. Preferably, there are multiple sound holes, and all sound holes are distributed around the sleeve 120. The base 110 and the sleeve 120 may be connected in a manner such as a screw connection, a buckle connection, and an adhesive connection to form the housing 100. A specific manner of connecting the base 110 and the sleeve 120 is not limited in this embodiment of this application.

A column shaft 111 is disposed on the base 110. Preferably, the column shaft 111 may be disposed in the middle of the base 110, and both the audio player 200 and the target detection apparatus 400 are disposed on the column shaft 111.

The target detection apparatus 400 may be a camera, or may be a human body infrared detection sensor. In a case that the target detection apparatus 400 is a camera, the target direction may be sensed by using the camera.

To prevent interference from the housing 100 to detection of the target direction by the camera, in an optional embodiment, the camera may be disposed in the housing 100, preferably on the top of the column shaft 111, and the sleeve 120 may be a transparent structural member. Therefore, the camera may detect the target direction by using the sleeve 120.

In another optional embodiment, one end of the column shaft 111 is connected to the base 110, and the other end of the column shaft 111 may extend out of the housing 100 through the sleeve 120. The camera is disposed on a part that is of the column shaft 111 and that is located outside the housing 100. In such setting, the housing 100 does not cause interference to detection of the target direction by the camera either.

The driving mechanism may include a power source 600, a rotation bracket 700, and a column shaft 111. The column shaft 111 is connected to the housing 100. The rotation bracket 700 is rotatably sleeved on the column shaft 111. The sound insulation cover 300 is disposed on the rotation bracket 700. The power source 600 is connected to the rotation bracket 700 to drive the rotation bracket 700 to rotate.

The power source 600 may be a motor, and the motor may be connected to the rotation bracket 700 in a manner such as gear driving, worm driving, or belt driving. A specific manner of connecting the power source 600 and the rotation bracket 700 is not limited in this embodiment of this application.

Figure 8:
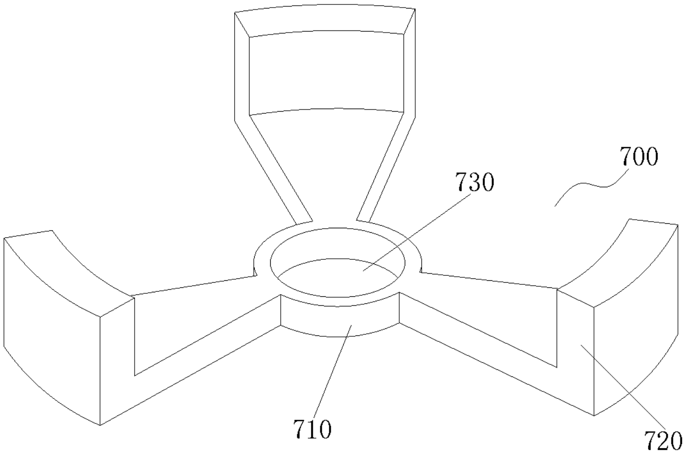
FIG. 8 is a schematic diagram of a structure of a rotation bracket.
Figure 9:
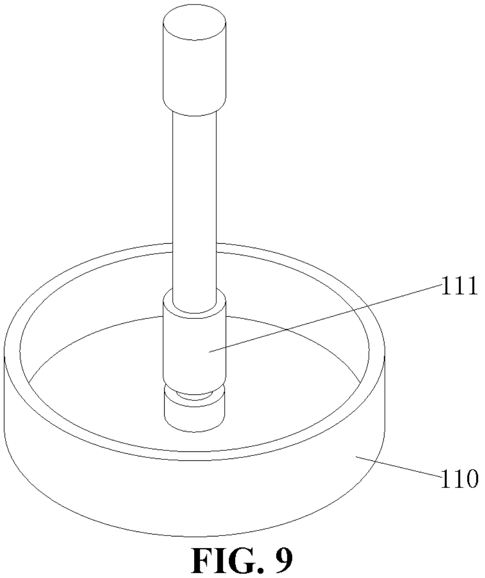
FIG. 9 is a schematic diagram of a structure of a base.

As shown in FIG. 8 and FIG. 9, the rotation bracket 700 includes a rotating part 710 and a bearing part 720 that are connected to each other. A shaft hole 730 is disposed on the rotating part 710. The rotating part 710 is sleeved on the column shaft 111 by using the shaft hole 730. The bearing part 720 is connected to a peripheral side of the rotating part 710. The sound insulation cover 300 is connected to the bearing part 720. Specifically, the inner housing 320 of the sound insulation cover 300 is connected to the bearing part 720.

Figure 10:
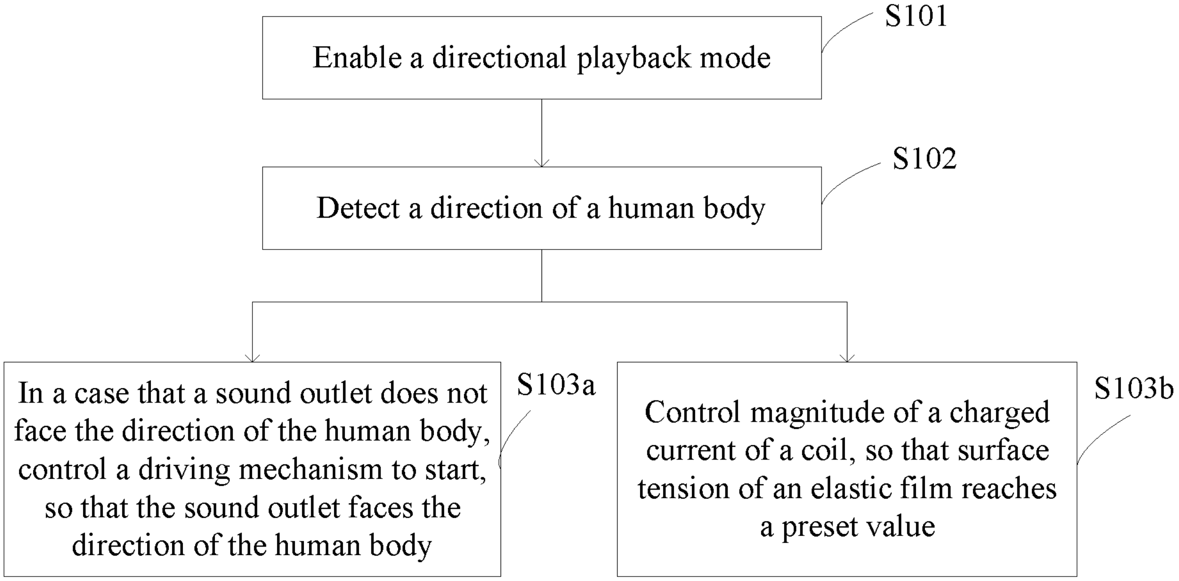
FIG. 10 is a first schematic flowchart of a control method for a playback device.

Based on the playback device disclosed in the embodiments of this application, an embodiment of this application further discloses a control method for a playback device. As shown in FIG. 10, the control method for a playback device includes the following steps:

S101: Enable a directional playback mode.

S102: Detect a target direction.

S103*a*: In a case that a sound outlet does not face the target direction, control a driving mechanism to start, so that the sound outlet faces the target direction.

The control method for a playback device further includes the following step:

S103*b*: Control magnitude of a charged current of a coil 530, so that surface tension of an elastic film 330 reaches a preset value.

Based on the playback device disclosed in the embodiments of this application, an embodiment of this application discloses a control apparatus for a playback device. The control apparatus includes:

a detection module, configured to detect a target direction; and a control module, configured to: in a case that a sound outlet does not face the target direction, control a driving mechanism to start, so that the sound outlet faces the target direction.

Figure 11:
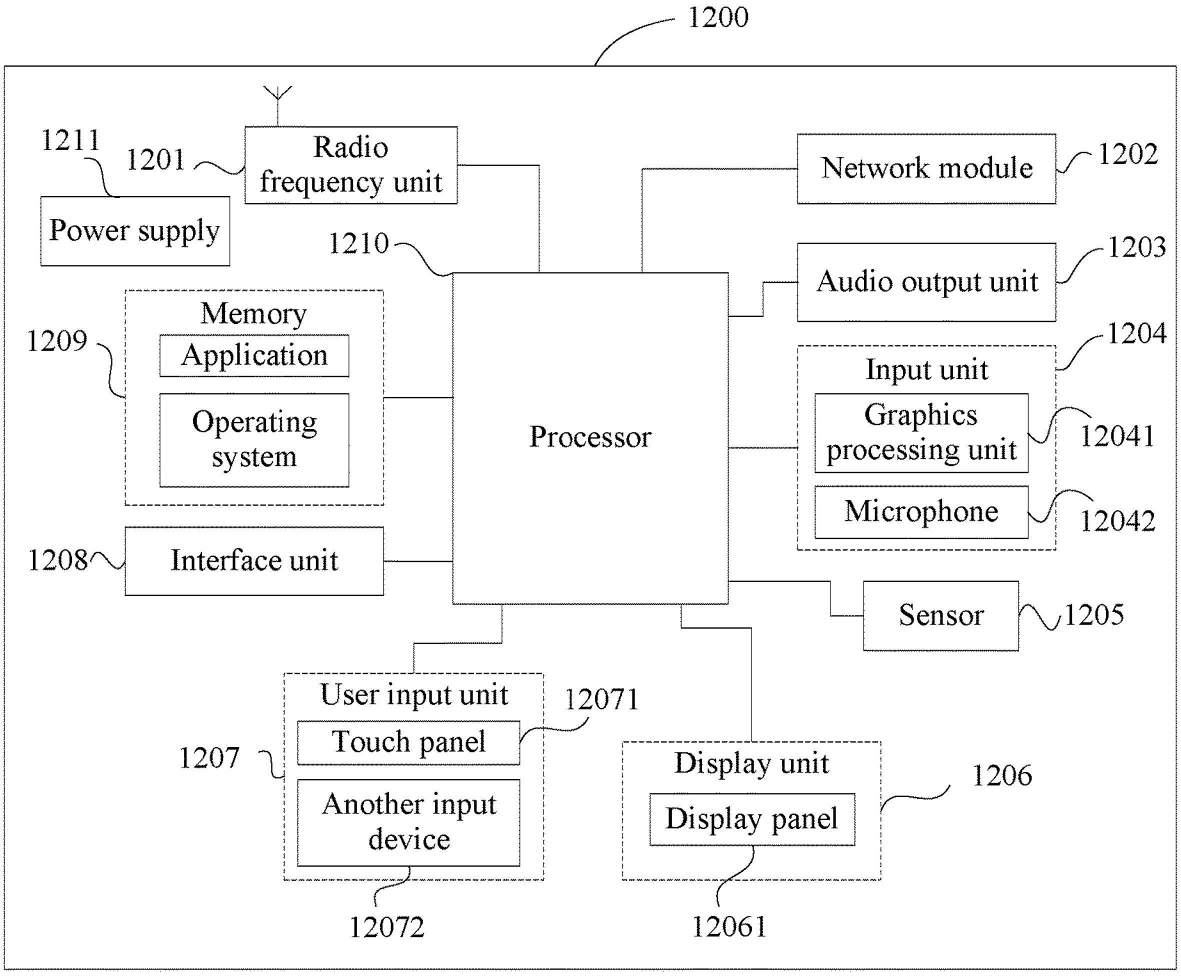
FIG. 11 is a schematic diagram of a hardware structure of a playback device according to an embodiment of this application.

FIG. 11 is a schematic diagram of a hardware structure of a playback device for implementing embodiments of this application.

A playback device 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that a structure of the playback device 1200 shown in FIG. 11 does not constitute a limitation on the playback device, and the playback device may include more or fewer components than those shown in the figure, or combine some components, or have different component arrangements.

The sensor 1205 is configured to detect a target direction.

The processor 1210 is configured to: in a case that a sound outlet does not face the target direction, control a driving mechanism to start, so that the sound outlet faces the target direction.

In the playback device disclosed in the embodiments of this application, a sound insulation cover 300 is disposed in a housing 100, an audio player 200 is disposed in a sound insulation cover 300, a sound outlet is disposed on the sound insulation cover 300, a target detection apparatus 400 is configured to detect a target direction, and a driving mechanism is connected to the sound insulation cover 300. In a specific working process, the target detection apparatus detects a target direction, and when the sound outlet does not face the target direction, the driving mechanism starts and drives the sound insulation cover 300 to rotate, so that the sound outlet faces the target direction. An audio signal that is played by the audio player 200 and that is corresponding to the sound outlet may be propagated outside the housing 100 through the sound outlet and the sound hole, and audio signals in another direction that are played by the audio player are blocked by the sound insulation cover 300, so that the playback device performs directional playback in the target direction.

It should be understood that, in the embodiments of this application, the radio frequency unit 1201 may be configured to receive and send information or a signal in a call process. Specifically, after receiving downlink data from a base station, the radio frequency unit 1201 sends the downlink data to the processor 1210 for processing. In addition, the radio frequency unit 1201 sends uplink data to the base station. Usually, the radio frequency unit 1201 includes but is not limited to an antenna, at least one amplifier, a transceiver, a coupler, a low noise amplifier, a duplexer, and the like. In addition, the radio frequency unit 1201 may communicate with a network and another device through a wireless communication system.

The playback device provides users with wireless broadband Internet access through the network module 1202, for example, helps users receive and send e-mails, browse web pages, and access streaming media.

The audio output unit 1203 may convert audio data received by the radio frequency unit 1201 or the network module 1202 or stored in the memory 1209 into an audio signal and output the audio signal as sound. In addition, the audio output unit 1203 can further provide audio output related to a specific function performed by the playback device 1200 (for example, call signal received sound and message received sound). The audio output unit 1203 includes a speaker, a buzzer, a telephone receiver, and the like.

The input unit 1204 is configured to receive an audio signal or a video signal. The input unit 1204 may include a graphics processing unit (GPU) 12041 and a microphone 12042, and the graphics processing unit 12041 processes image data of a still picture or video obtained by an image capture apparatus (such as a camera) in a video capture mode or an image capture mode. A processed image frame may be displayed on the display unit 1206. The image frame processed by the graphics processing unit 12041 may be stored in the memory 1209 (or another storage medium) or sent by using the radio frequency unit 1201 or the network module 1202. The microphone 12042 may receive sound and can process such sound into audio data. Processed audio data may be converted, in a call mode, into a format that can be sent to a mobile communication base station by using the radio frequency unit 1201 for output.

The playback device 1200 further includes at least one sensor 1205, for example, a light sensor, a motion sensor, and another sensor. Specifically, the light sensor includes an ambient light sensor and a proximity sensor. The ambient light sensor may adjust luminance of the display panel 12061 based on brightness of ambient light. The proximity sensor may turn off the display panel 12061 and/or backlight when the playback device 1200 moves close to an ear. As a type of the motion sensor, an accelerometer sensor may detect an acceleration in each direction (generally, three axes), and detect a value and a direction of gravity when the accelerometer sensor is static, and may be configured to recognize a posture of the playback device (such as screen switching between landscape and portrait modes, a related game, or magnetometer posture calibration), a function related to vibration recognition (such as a pedometer or a knock), and the like. The sensor 1205 may further include a fingerprint sensor, a pressure sensor, an iris sensor, a molecular sensor, a gyroscope, a barometer, a hygrometer, a thermometer, and an infrared sensor. Details are not described herein.

The display unit 1206 is configured to display information entered by the user or information provided for the user. The display unit 1206 may include a display panel 12061, and may configure the display panel 12061 in forms such as a liquid crystal display (LCD), an organic light-emitting diode (OLED), and the like.

The user input unit 1207 may be configured to: receive entered digital or character information, and generate key signal input related to user setting and function control of the playback device. Specifically, the user input unit 1207 includes a touch panel 12071 and another input device 12072. The touch panel 12071 is also referred to as a touchscreen, and may collect a touch operation of the user on or near the touch panel (for example, an operation performed on or near the touch panel 12071 by the user by using any appropriate object or accessory such as a finger or a stylus). The touch panel 12071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 1210, and receives and executes a command sent by the processor 1210. In addition, the touch panel 12071 may be implemented in various types such as a resistor, a capacitor, an infrared ray, or a surface acoustic wave. The user input unit 1207 may include another input device 12072 in addition to the touch panel 12071. Specifically, the another input device 12072 may include but is not limited to a physical keyboard, a functional button (such as a volume control button or a power on/off button), a trackball, a mouse, and a joystick. Details are not described herein.

Further, the touch panel 12071 may cover the display panel 12061. After detecting the touch operation on or near the touch panel 12071, the touch panel 12071 transmits the touch operation to the processor 1210 to determine a type of a touch event, and then the processor 1210 provides corresponding visual output on the display panel 12061 based on the type of the touch event. Although the touch panel 12071 and the display panel 12061 in FIG. 11 are configured as two independent components to implement input and output functions of the playback device, in some embodiments, the touch panel 12071 and the display panel 12061 may be integrated to implement the input and output functions of the playback device. Details are not limited herein.

The interface unit 1208 is an interface for connecting an external apparatus with the playback device 1200. For example, the external apparatus may include a wired or wireless headset jack, an external power supply (or a battery charger) port, a wired or wireless data port, a storage card port, a port for connecting an apparatus with an identification module, an audio input/output (I/O) port, a video I/O port, and a headset jack. The interface unit 1208 may be configured to receive input (for example, data information or power) from an external apparatus and transmit the received input to one or more elements in the playback device 1200, or transmit data between the playback device 1200 and the external apparatus.

The memory 1209 may be configured to store a software program and various data. The memory 1209 may mainly include a program storage area and a data storage area. The program storage area may store an operating system, an application program required by at least one function (such as a sound playback function and an image playback function), and the like. The data storage area may store data (such as audio data and a phone book) created based on use of the playback device, and the like. In addition, the memory 1209 may include a high-speed random access memory, and may further include a nonvolatile memory, for example, at least one magnetic disk storage device, a flash storage device, or another volatile solid-state storage device.

The processor 1210 is a control center of the playback device, connects all parts of the entire playback device by using various interfaces and lines, and performs various functions of the playback device and data processing by running or executing a software program and/or a module that are/is stored in the memory 1209 and by invoking data stored in the memory 1209, to perform overall monitoring of the playback device. The processor 1210 may include one or more processing units. Optionally, an application processor and a modem processor may be integrated into the processor 1210. The application processor mainly processes an operating system, a user interface, an application program, and the like. The modem processor mainly processes wireless communications. It can be understood that, alternatively, the modem processor may not be integrated into the processor 1210.

The playback device 1200 may further include the power supply 1211 (such as a battery) supplying power to each component. Preferably, the power supply 1211 may be logically connected to the processor 1210 by using a power management system, to implement functions such as charging and discharging management and power consumption management by using the power management system.

In addition, the playback device 1200 includes some function modules not shown. Details are not described herein.

Optionally, an embodiment of this application further discloses a terminal device, including a processor 1210, a memory 1209, and a program or an instruction that is stored in the memory 1209 and that can be run on the processor 1210. When the program or the instruction is executed by the processor 1210, processes of any one of the foregoing method embodiments are implemented, and a same technical effect can be achieved. To avoid repetition, details are not described herein again.

An embodiment of this application further discloses a computer-readable storage medium. The computer-readable storage medium stores a program or an instruction, and when the program or the instruction is executed by a processor 1210, processes of any one of the foregoing method embodiments are implemented, and a same technical effect can be achieved. To avoid repetition, details are not described herein again. The readable storage medium is, for example, a read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction of a network side device to implement processes of any one of the foregoing method embodiments are implemented, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The computer program product includes a processor, a memory, and a program or instruction that is stored in the memory and that can be run on the processor. When the program or the instruction is executed by the processor, processes of any one of the foregoing method embodiments are implemented, and a same technical effect can be achieved. To avoid repetition, details are not described herein again.

An embodiment of this application further provides an electronic device. The electronic device is configured to perform processes of any one of the foregoing method embodiments, and a same technical effect can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a playback device (which may be mobile phone, a computer, a server, an air conditioner, a network device, or the like) to perform the method described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

What is claimed is:

1. A playback device, comprising:

a housing, wherein a sound hole is disposed on the housing;

an audio player;

a sound insulation cover, wherein the sound insulation cover is disposed in the housing, the audio player is disposed in the sound insulation cover, and a sound outlet is disposed on the sound insulation cover;

a target detection apparatus, wherein the target detection apparatus is configured to detect a target direction; and a driving mechanism, wherein the driving mechanism is disposed in the housing, the driving mechanism is connected to the sound insulation cover, and the driving mechanism is configured to drive the sound insulation cover to rotate, so that the sound outlet faces the target direction;

wherein the sound insulation cover comprises an outer housing, an inner housing, and an elastic film, a first through-hole array is disposed on the outer housing, a second through-hole array is disposed on the inner housing, the first through-hole array corresponds to the second through-hole array, and the elastic film is disposed between the outer housing and the inner housing.

2. The playback device according to claim 1, wherein the first through-hole array comprises multiple first through-holes, the second through-hole array comprises multiple second through-holes, the first through-holes and the second through-holes are honeycomb holes, and the first through-holes are in a one-to-one correspondence with the second through-holes.

3. The playback device according to claim 1, wherein the sound insulation cover is a cylindrical structural member, and the sound outlet is provided on a ring wall of the sound insulation cover.

4. The playback device according to claim 1, wherein the sound insulation cover further comprises a tensioning mechanism, the tensioning mechanism is disposed in the housing, the tensioning mechanism is connected to the elastic film, and surface tension of the elastic film is adjusted by pulling the elastic film.

5. The playback device according to claim 4, wherein the tensioning mechanism comprises a first magnetic member and a coil, a first end of the elastic film is connected to the first magnetic member, and in a case that the coil is charged with electricity, the coil is configured to be magnetically attracted to the first magnetic member to pull the elastic film; and/or the tensioning mechanism comprises a second magnetic member and the coil, a second end of the elastic film is connected to the second magnetic member, and in a case that the coil is charged with electricity, the coil is configured to be magnetically attracted to the second magnetic member to pull the elastic film.

6. The playback device according to claim 5, wherein the tensioning mechanism further comprises a first elastic member, the first elastic member is disposed between the first magnetic member and the outer housing or the inner housing, and an extension-contraction direction of the first elastic member is consistent with a movement direction of the first magnetic member; and/or the tensioning mechanism further comprises a second elastic member, the second elastic member is disposed between the second magnetic member and the outer housing or the inner housing, and an extension-contraction direction of the second elastic member is consistent with a movement direction of the second magnetic member.

7. The playback device according to claim 5, wherein the coil is disposed between the first magnetic member and the second magnetic member.

8. The playback device according to claim 1, wherein the elastic film is fastened between the outer housing and the inner housing.

9. The playback device according to claim 1, wherein the driving mechanism comprises a power source, a rotation bracket, and a column shaft, the column shaft is connected to the housing, the rotation bracket is rotatably sleeved on the column shaft, the sound insulation cover is disposed on the rotation bracket, and the power source is connected to the rotation bracket to drive the rotation bracket to rotate.

10. The playback device according to claim 9, wherein the rotating bracket comprises a rotating part and a bearing part that are connected to each other, a shaft hole is disposed on the rotating part, the rotating part is sleeved on the column shaft by using the shaft hole, the bearing part is connected to a peripheral side of the rotating part, and the sound insulation cover is connected to the bearing part.

11. The playback device according to claim 10, wherein the housing comprises a base and a sleeve, the base is connected to the sleeve, and accommodation space is defined between the base and the sleeve.

12. A control method for a playback device, wherein the playback device comprises:

a housing, wherein a sound hole is disposed on the housing;

an audio player;

a sound insulation cover, wherein the sound insulation cover is disposed in the housing, the audio player is disposed in the sound insulation cover, and a sound outlet is disposed on the sound insulation cover;

a target detection apparatus, wherein the target detection apparatus is configured to detect a target direction; and a driving mechanism, wherein the driving mechanism is disposed in the housing, the driving mechanism is connected to the sound insulation cover, and the driving mechanism is configured to drive the sound insulation cover to rotate, so that the sound outlet faces the target direction;

wherein the sound insulation cover comprises an outer housing, an inner housing, and an elastic film, a first through-hole array is disposed on the outer housing, a second through-hole array is disposed on the inner housing, the first through-hole array corresponds to the second through-hole array, and the elastic film is disposed between the outer housing and the inner housing;

wherein the control method comprises:

enabling a directional playback mode;

detecting a target direction; and in a case that the sound outlet does not face the target direction, controlling the driving mechanism to start, so that the sound outlet faces the target direction.

13. The control method for a playback device according to claim 12, wherein the sound insulation cover comprises a tensioning mechanism, the tensioning mechanism comprises a coil, a first magnetic member, and/or a second magnetic member, the coil is disposed in the housing, the first magnetic member and/or the second magnetic member are/is connected to the elastic film, and in a case that the coil is charged with electricity, the coil is configured to be magnetically attracted to the first magnetic member and/or the second magnetic member to pull the elastic film, and the control method further comprises:

controlling magnitude of a charged current of the coil, so that surface tension of the elastic film reaches a preset value.

14. A playback device, comprising a processor, a memory, and a computer program that is stored in the memory and that is executable on the processor, wherein the playback device further comprises:

a housing, wherein a sound hole is disposed on the housing;

an audio player;

a sound insulation cover, wherein the sound insulation cover is disposed in the housing, the audio player is disposed in the sound insulation cover, and a sound outlet is disposed on the sound insulation cover;

a target detection apparatus, wherein the target detection apparatus is configured to detect a target direction; and a driving mechanism, wherein the driving mechanism is disposed in the housing, the driving mechanism is connected to the sound insulation cover, and the driving mechanism is configured to drive the sound insulation cover to rotate, so that the sound outlet faces the target direction;

wherein when the computer program is executed by the processor, steps of the control method according to claim 12 are implemented.

15. A playback device, comprising a processor, a memory, and a computer program that is stored in the memory and that is executable on the processor, wherein the playback device further comprises:

a housing, wherein a sound hole is disposed on the housing;

an audio player;

a sound insulation cover, wherein the sound insulation cover is disposed in the housing, the audio player is disposed in the sound insulation cover, and a sound outlet is disposed on the sound insulation cover;

a target detection apparatus, wherein the target detection apparatus is configured to detect a target direction; and a driving mechanism, wherein the driving mechanism is disposed in the housing, the driving mechanism is connected to the sound insulation cover, and the driving mechanism is configured to drive the sound insulation cover to rotate, so that the sound outlet faces the target direction;

wherein when the computer program is executed by the processor, steps of the control method according to claim 13 are implemented.

16. A non-transitory computer-readable storage medium, wherein the non-transitory computer-readable storage medium stores a computer program, and when the computer program is executed by a processor of a playback device, steps of the control method according to claim 12 are implemented, wherein the playback device further comprises:

a housing, wherein a sound hole is disposed on the housing;

an audio player;

a sound insulation cover, wherein the sound insulation cover is disposed in the housing, the audio player is disposed in the sound insulation cover, and a sound outlet is disposed on the sound insulation cover;

a target detection apparatus, wherein the target detection apparatus is configured to detect a target direction; and a driving mechanism, wherein the driving mechanism is disposed in the housing, the driving mechanism is connected to the sound insulation cover, and the driving mechanism is configured to drive the sound insulation cover to rotate, so that the sound outlet faces the target direction.

17. A non-transitory computer-readable storage medium, wherein the non-transitory computer-readable storage medium stores a computer program, and when the computer program is executed by a processor of a playback device, steps of the control method according to claim 12 are implemented, wherein the playback device further comprises:

a housing, wherein a sound hole is disposed on the housing;

an audio player;

a sound insulation cover, wherein the sound insulation cover is disposed in the housing, the audio player is disposed in the sound insulation cover, and a sound outlet is disposed on the sound insulation cover;

a target detection apparatus, wherein the target detection apparatus is configured to detect a target direction; and a driving mechanism, wherein the driving mechanism is disposed in the housing, the driving mechanism is connected to the sound insulation cover, and the driving mechanism is configured to drive the sound insulation cover to rotate, so that the sound outlet faces the target direction.

* * * * *